Feb. 10, 1931.  E. S. CLAPPER  1,791,884
CORNSTALK SHIELD FOR GRAIN BINDERS
Filed Sept. 23, 1929
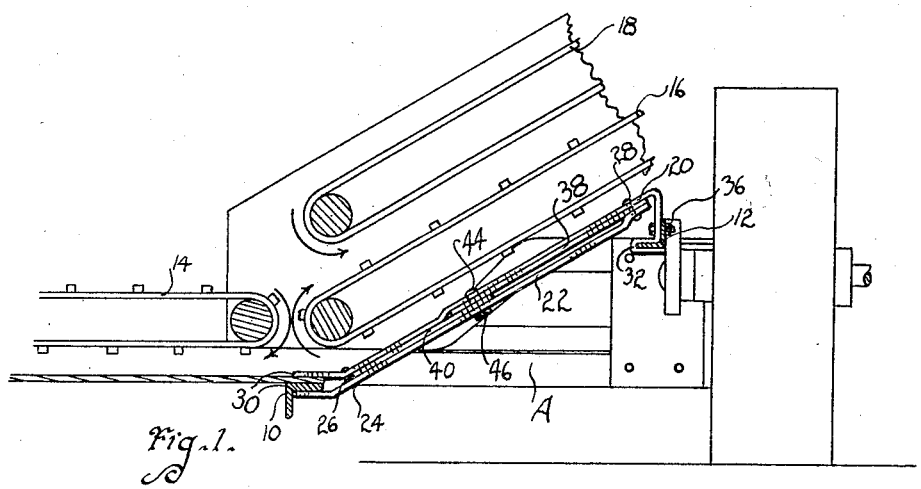
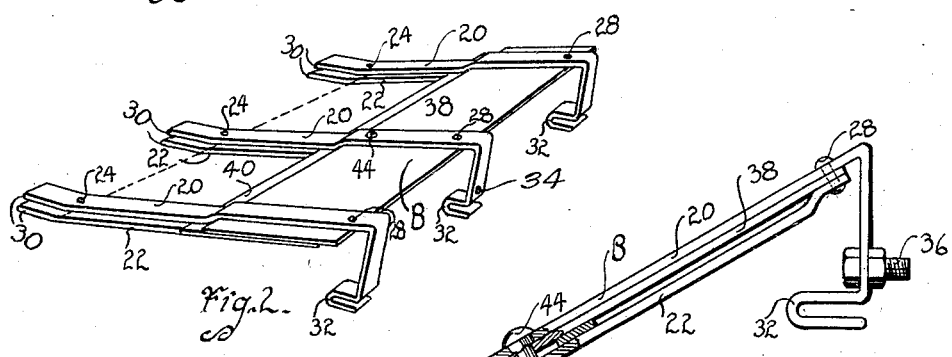
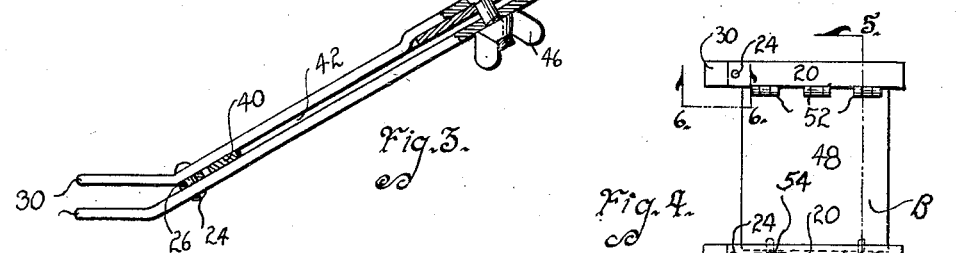
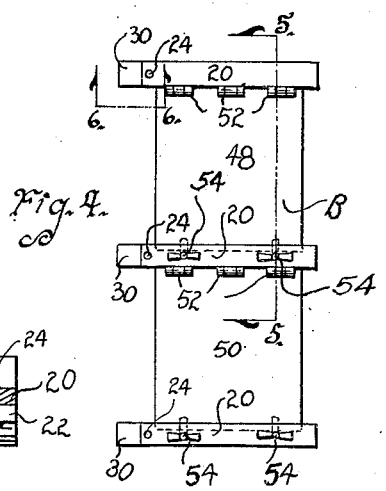
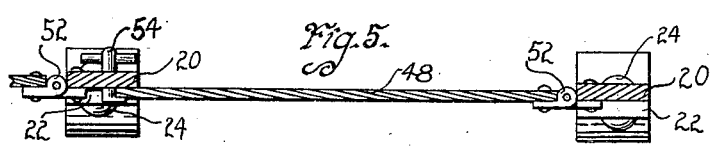
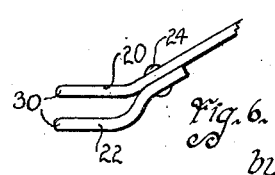
Inventor
Elmer S. Clapper
by Bair Freeman & Sinclair
Attorneys
Witness
Edw. Leley Patented Feb. 10, 1931

1,791,884

UNITED STATES PATENT OFFICE

ELMER S. CLAPPER, OF SPENCER, IOWA

CORNSTALK SHIELD FOR GRAIN BINDERS

Application filed September 23, 1929. Serial No. 394,549.

The object of my invention is to provide a corn stalk shield for grain binders of simple, durable and comparatively inexpensive construction.

More particularly, it is my object to provide a shield beneath the elevating conveyor of a grain binder to prevent corn stalks and the like, in a field which has been planted to wheat or other grain after it has been planted to corn the previous season, from projecting into the platform and elevating conveyors and clogging them up. In this connection it is very desirable to have a shield, as the clogging of the conveyors by corn stalks necessitates stopping and clearing the stalks away several times in an hour, which causes considerable delay and consequent loss of time.

An other object is to provide a corn stalk shield consisting of a plurality of supporting bars suitably connected with the frame of the binder and having a shield plate mounted on them, a portion of the shield plate being movable so that access can be had to the conveyors from beneath the binder for repairing them etc.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a vertical sectional view through a portion of a grain binder illustrating my shield applied thereto.

Figure 2 is a perspective view of the shield detached from the binder.

Figure 3 is an end elevation of the shield, portions of the shield being broken away and shown in section.

Figure 4 is a plan view of a modified form of shield.

Figure 5 is a sectional view on the line 5—5 of Figure 4; and

Figure 6 is a detail view on the line 6—6 of Figure 4.

On the accompanying drawings, I have used the reference character A to indicate generally, the frame of a grain binder. The frame A includes a lower frame member 10 and an upper frame member 12 which extend forwardly and rearwardly from the front of the frame A to the rear thereof.

The platform conveyor of the binder is indicated at 14, the elevating conveyor at 16 and the floating conveyor at 18.

My shield structure is indicated generally by the reference character B and is adapted to be positioned with respect to the binder as clearly illustrated in Figure 1.

My corn stalk shield consists of a plurality of supporting bars 20 and 22 secured together at their lower ends by rivets 24 and spacers 26 and at their upper ends by rivets 28. The lower ends of the bars 20 and 22 form a fork 30, while the upper end is bent as indicated at 32 to fit over the upper frame member 12.

One or more of the bars 20 may be provided with an opening 34, whereby to receive a bolt 36 for bolting the upper end of the device to the upper frame member 12.

The forks 30 of the lower side of the corn stalk shield merely receive the frame member 10 between them, as shown in Figure 1.

In connection with the supporting bars I provide a stationary shield plate 38 and a movable shield plate 40. The plate 38 is secured in position by the rivets 28, while the plate 40 slides between the spaced bars 20 and 22. A slot 42 is provided in the plate 40 through which a set screw 44 provided with a wing nut 46 extends. Thus, the plate 40 may be slidably adjusted up or down and retained in any position.

The purpose of having the plate 40 slidable is so that it can be raised when it is desired to get at the conveyors 14 and 16 from underneath the binder to repair them or replace parts.

In Figure 4, I have shown a modified construction in which a pair of shield plates 48 and 50 are provided. The plates 48 and 50 are hinged as indicated at 52 to the supporting bars 20 and have their free edges swingable downwardly. Latch devices 54 are provided for holding these free edges in up or operative position during binding operations. As shown in Figure 6, the spacer 26 is dispensed with in this type of device.

From the foregoing description it may be seen that I have provided a corn stalk shield which not only protects the conveyors of the binder from clogging by corn stalks, but may be manipulated for easily gaining access to the conveyors from beneath the binder.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a corn stalk shield for grain binders, a plurality of supporting bars for attachment beneath the elevating conveyor of the binder, and a shield plate slidably mounted thereon whereby in its lower position it shields the conveyors of the binder from corn stalks and the like and in its upper position admits of access to the conveyors from beneath the binder.

2. In a corn stalk shield for grain binders, a plurality of supporting bars for attachment beneath the elevating conveyor of the binder, a stationary shield thereon, and a movable shield plate mounted thereon whereby in one position it shields the conveyors of the binder from corn stalks and the like and in another position admits of access to the conveyors from beneath the binder.

3. In a corn stalk shield for grain binders, a plurality of supporting bars for attachment beneath the elevating conveyor of the binder, and a shield plate mounted thereon, said shield plate being capable of movement to non-shielding position whereby it admits of access to the conveyors from beneath the binder.

4. For use with a binder having a lower and upper frame members, a shield comprising supporting bars extending from the lower frame member to the upper frame member and secured to them, a shield member slidable longitudinally relative to said supporting bars and means to secure the shield in any position thereon.

Des Moines, Iowa, September 13, 1929.

ELMER S. CLAPPER.